United States Patent [19]

Monacelli

[11] 4,260,093

[45] Apr. 7, 1981

[54] NAIL-GUIDING MEMBER FOR A NAIL-DRIVING MACHINE

[76] Inventor: Umberto Monacelli, Via Parini 6, Monza (Milan), Italy

[21] Appl. No.: 50,205

[22] Filed: Jun. 20, 1979

[30] Foreign Application Priority Data

Jun. 21, 1978 [IT] Italy .............................. 22155/78[U]

[51] Int. Cl.³ .............................................. B25L 3/00
[52] U.S. Cl. .................................... 227/120; 227/156; 206/345
[58] Field of Search ................ 206/345, 347; 227/107, 227/109, 120, 135, 136, 156

[56] References Cited

U.S. PATENT DOCUMENTS 3,060,439  10/1962  Haubold ............................... 227/120
4,136,810  1/1979  Bull ..................................... 227/120

Primary Examiner—Paul A. Bell
Attorney, Agent, or Firm—Haseltine and Lake

[57] ABSTRACT

For a nail-driving machine a guide-bar is disclosed, having generally the shape of an open hairpin with short staggered inclines to retain the nail row in position and to guide the nail magazine as the latter is being fed forward under the nail-driving ram.

3 Claims, 3 Drawing Figures

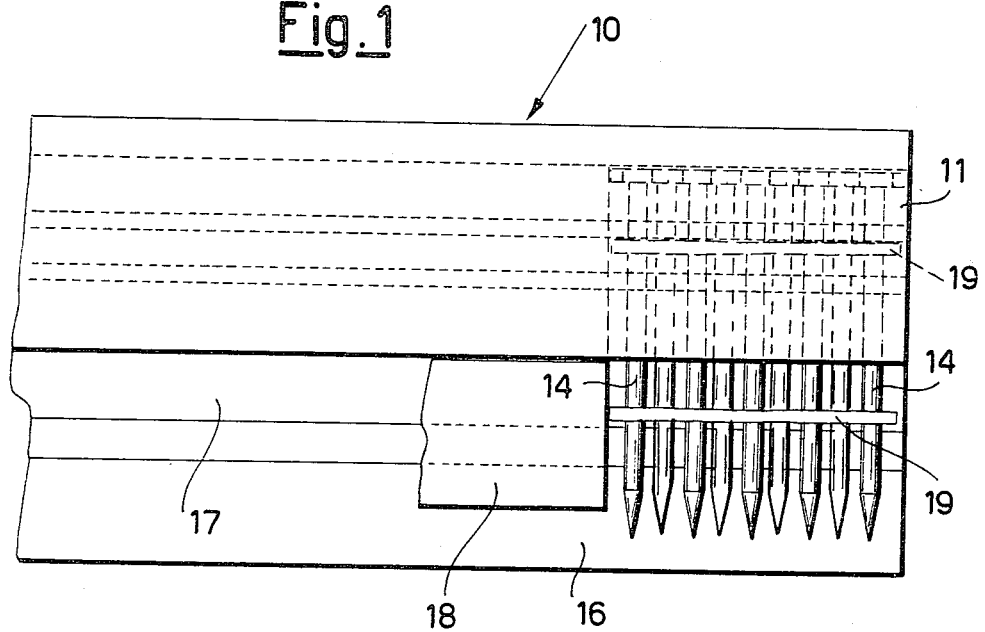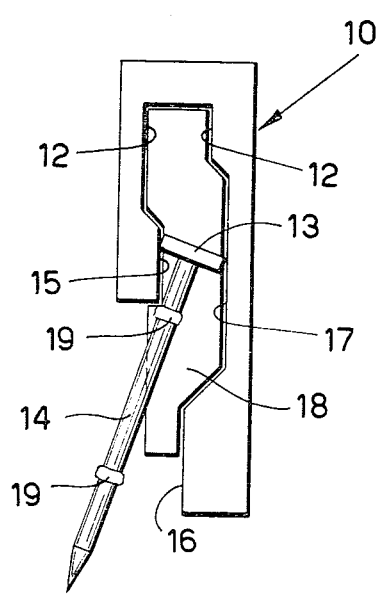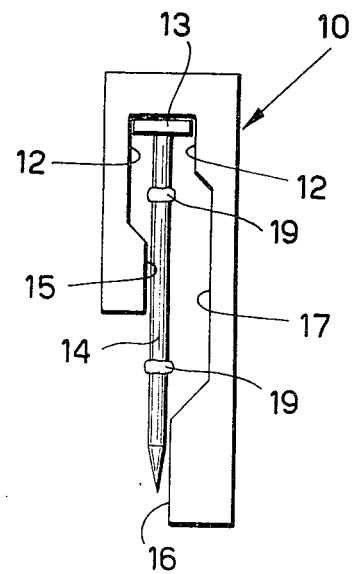

NAIL-GUIDING MEMBER FOR A NAIL-DRIVING MACHINE

It is known that automatic ramming apparatus comprises a charger in which there is housed a plurality of members to be rammed, held in an orderly row and pressed by a pusher in such a way that the first one of the members of the row is aligned in correspondence with the trajectory of action of the ramming striker pin.

Those guides should keep the pushed members in good alignment, holding them effectively sideways, with minimal clearance in order that they may not overlap and thereby get locked in their sliding movement towards the shooting position.

The general structure of such apparatus in particular of the kind having a grip, provides accessibility of the guide from the side corresponding to the tip of the members to be rammed, that is to say from the side where the exit of the member shot is provided. At the top, instead, the guide comes to find itself in correspondence with its supports, the grip, the apparatus and so on.

The loading of members to be rammed, such as nails, is carried out by introducing into the guide a certain group thereof, joined in alignment by filling material of moderate tenacity, so as to form a sort of small bar.

In known apparatus, if the members are provided with a head, as in the shape of conventional nails, the inserting of the small bar into the guide has to be carried out longitudinally, and can at any rate by no means be done transversally from the bottom of the guide, since the heads of the nails cannot enter the slit of the guide receiving the shanks, which have smaller diameter.

Now it has been found that it is possible to provide a guide adapted to hold in rigid alignment nails having a head, and capable of receiving such nails from the side of the guide that holds the shanks.

To attain this object the invention provides a guide endowed with a seat having a generic U-shaped section and a base adapted to guide the heads of the nails, a first longitudinal surface projecting from one of the branches of the U to bear against the shank of the nails, a second longitudinal surface bearing against the shank of the nails, projecting from the other one of the branches of the U, at a greater distance from the base than the first surface, the distance between the first surface and the wall in front of the other branch being greater than the diametral dimension of the head of the nails.

To make the objects of the invention and the essential constructive features of the guide more fully clear, an embodiment thereof given by way of example will be described hereinafter with reference to the accompanying drawing, wherein:

FIG. 1 is a diagrammatical side view of a guide according to the invention,

FIG. 2 is a front view of the same guide,

FIG. 3 is a view analogous to FIG. 2, in a different operative position.

A guide generically indicated by reference numeral 10 comprises a body 11 generically in the shape of a U having unequal branches. At the bottom of the U-shape there is provided a seat 12 of modest height adapted to receive the head 13 of nails 14.

One branch of the U-shape provides a projecting longitudinal surface 15 that rests on the shank of the nails, the other branch provides an analogous surface 16 staggered with respect to the surface 15.

Between the surface 16 and the seat 12 there is formed a subsidence 17 in such a way that the transversal distance between the surface 15 and the bottom of the subsidence 17 will be greater than the width of the head 13 of the nails.

Finally in the guide 10 there slides a pusher 18 having a profile complementary to that of the guide, and adapted to push the assembly of the nails, controlled elastically in a manner not shown because conventional with this kind of apparatus.

The nails are then joined with one another in any conventional manner, for instance by glueing, or by threading them into one or more strips of breakable material, for instance plastics, as represented diagrammatically at 19, which breaks setting every nail free when it is subjected to the action of the striker pin ramming it. The nails are thus kept in the shape of a small bar so as to be more easily handled.

The shape of the guide, as proposed by the invention, allows a transversal introduction of the nails, as shown in FIG. 3, where there is represented an intermediate position of the stroke of the nails that are completely housed in the guide.

As can be seen, the head of the nails can pass through the zone of the guide that is destined to hold the shanks, though being of smaller diameter, thanks to the circumstance that in this latter zone the guide is provided with two staggered surfaces. Nowithstanding that, if the nails have attained the position shown in FIG. 2, they are held in perfect alignment, avoiding any overlapping also under the action of the pusher.

The advantages of a transversal loading of the guides will be evident for those skilled in the art, with an evident greater quickness and simplicity with respect to a conventional loading effected by longitudinal insertion by fitting in from one of the ends of the guide.

Of course, though within the scope of the invention now set forth, the constructive shape of the guide may vary, becoming adapted among other things for the different sizes and shapes of nails to be received.

I claim:

1. A guide for receiving in orderly row members to be rammed, said members having a shank and a widened head such as nails, comprising a seat with generically U-shaped section, a base adapted to guide the heads of the nails, a first longitudinal surface projecting from one of the branches of the U-shape to rest on the shank of the nails, a second longitudinal surface resting on the shank of the nails and projecting from the other one of the branches of the U-shape, at a greater distance from the base than the distance of the first surface from the base, the distance between the first surface and the surface of the other branch opposite the first surface being greater than the diametral dimension of the head of the nails.

2. The guide according to claim 1, wherein the surface of the other branch opposite the first surface is subsided in correspondence with the zone in front of the first surface.

3. The guide according to claim 1, having within it a pusher for the row of members introduced into the guide, the pusher having a cross-section complementary to that of the guide.

* * * * *